A. Barbarin,
Siphon,
N° 83,024. Patented Oct. 13, 1868.
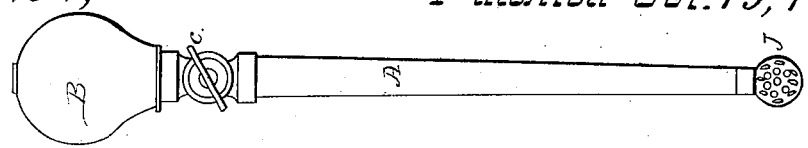
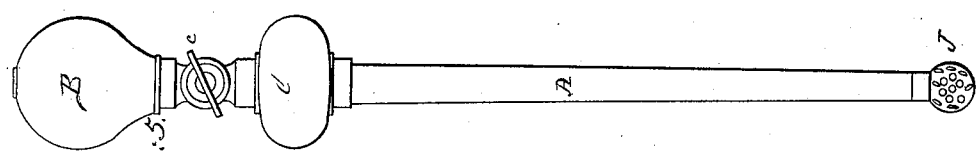
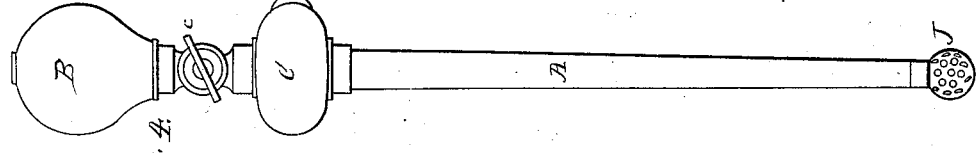
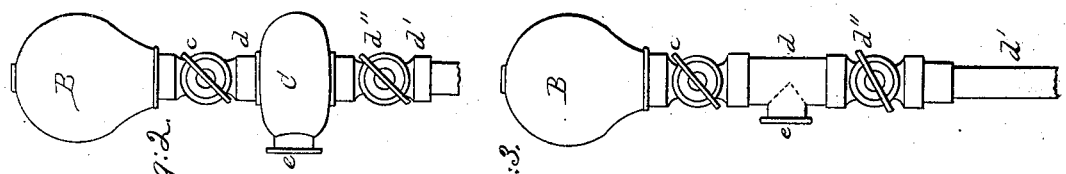
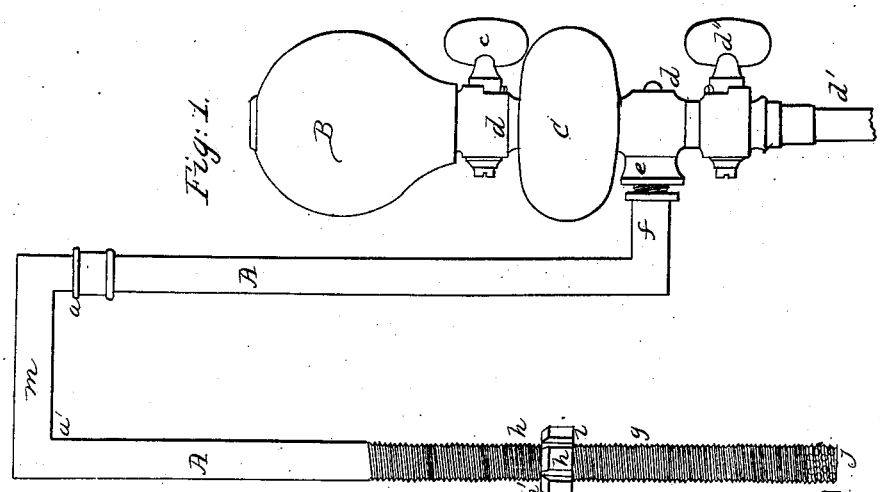
Witnesses.
Marcellus Bailey
C. S. Page jr
Inventor.
Arthur Barbarin
By his atty A. Pollok

ARTHUR BARBARIN, OF NEW ORLEANS, LOUISIANA.

*Letters Patent No. 83,024, dated October 13, 1868.*

IMPROVEMENT IN LIQUID-SAMPLERS.

The Schedule referred to in these Letters Patent and making part of the same.

*To whom it may concern:*

Be it known that I, ARTHUR BARBARIN, of New Orleans, in the parish of Orleans, and State of Louisiana, have invented certain new and useful Improvements in Siphons and Liquid-Samplers; and I hereby declare the following to be a full, clear, and exact description of the same, reference being had to the accompanying drawings.

My invention consists of apparatus constructed in whole or in part of glass, gutta-percha, or metal, by means of which an instantaneous and effective vacuum is produced at will, when the same is applied to a siphon or to a "liquid-sampler," as herein described, and shown upon the drawings, for the purpose of raising and transferring liquids from a vessel to another without having recourse to the ordinary slow, uncertain, and dangerous process of sucking with the mouth to obtain said vacuum, and to facilitate an examination of the color, &c., of the liquid as it passes through the siphon with or without a glass reservoir, or when contained in a sampler with or without a glass reservoir. These constitute the most decided merits of my invention.

As an effective agent for transferring acids from carboys, &c., to other receptacles, without fear of accidents, it has no equal, and yet its construction is so simple that any person, however dull of intellect, will readily understand its mode of operation.

But my invention will be more clearly understood by referring to the annexed drawings, in which—

Figure 1 is a perspective view of an ordinary siphon, A A, connected to one of my devices.

B is an air-tight rubber bulb, of any size, shape, or thickness.

$c$ is an air-tight stop-cock, its lower end being firmly secured to the upper throat of the glass reservoir C, while its upper end, provided with a flanch, receives and supports the rubber valve through the latter's throat, which, owing to its elasticity, firmly clasps said end, and with the assistance of a piece of metal wire or twine wound around the same, is made immovable and air-tight.

$d\ d'$ is a discharge-pipe firmly connected to the lower throat of the glass reservoir C, provided also with an air-tight stop-cock, $d''$, and throat $e$, the latter being for the reception and connection (screwed or otherwise secured,) of the end, $f$, of the siphon.

$g$ represents a screw-thread surface of the shorter end of the siphon, which surface is provided with a nut, $h$, having grooves $h'$, and projecting pins $i\ i$ for the purpose of raising or lowering and supporting the apparatus in position; and $j$ represents small perforations (see black dots) at the shorter end of the siphon, to admit nothing but the liquid within the tube.

Instead of the nut $h$, with pins $i\ i$, the short end of the siphon may be made to penetrate through a conical rubber, wax, or other soft stopper, to fit different sizes of carboys, &c., and act as a support for the siphon when in use, and in order that the atmosphere may act upon the liquid contained in a vessel after the siphon and stopper have been placed in position for operation, small tubes may be inserted into said stopper, so that notwithstanding the pressure exerted upon the stopper by the walls or neck of the carboy, &c., small apertures will still be left open by means of the tubes, to admit the action of the air upon the liquid contained within the vessel.

Should a conical glass or other hard stopper be used in preference to a soft one, its centre hole should be made wide enough to admit the introduction of the end of the siphon through it, as well as the passage of the air within the vessel to act upon the liquid contained therein.

Figure 2 is a modification of fig. 1. In this device the throat $e$, as will be seen, is immediately connected to the glass reservoir C, instead of forming part of the discharge-pipe $d\ d'$, as shown in fig. 1.

Figure 3 is a modification of the two previous devices, no reservoir C being used in connection with this device.

Figure 4 is a liquid-sampler. A is a tube, about one to one and a half foot long, about one inch wide at the top, and tapering to a point or opening of about one-fourth of an inch in diameter, said opening being provided with a perforated hollow ball, J, or its equivalent, to allow nothing but the liquid to be sampled to be drawn within the tube when in operation.

To the top of the tube A is secured, air-tight, a glass or other transparent reservoir C, provided with a small discharge-pipe, $d$, having an air-tight stop-cock, $d'$, for the purpose of letting the liquid out, or for testing it through that channel when contained within the reservoir. $c$ is another air-tight stop-cock connected to the upper throat of the reservoir C, and is also provided with a flanch, as in fig. 1, to receive and support its rubber valve B, which is more firmly secured thereto by means of a piece of wire wound around the throat of said valve, and bearing against the frame of said stop-cock.

Figure 5 is similar to fig. 4, but in this device no discharge-pipe $d$ and stop-cock $d'$ are used.

Figure 6 has neither reservoir C nor discharge-pipe $d$, nor stop-cock $d'$, and in lieu of the perforated hollow ball J at its lower end, the same may be perforated, as in fig. 1. But this device should be constructed of glass or other transparent material, it being intended for sampling acids only.

To use a siphon as when constructed and connected to my apparatus, as shown on the drawings, it is necessary, first, to see that the stop-cock $d''$ be closed air-tight, then the stop-cock $c$ being turned open, the operator, by depressing or compressing the rubber bulb B with one hand, forces the air out of the reservoir C through the throat e, and out of the tube A through the perforations f. As soon as this is accomplished, and while the rubber valve is kept depressed by the hand, the perforated end of the tube A is inserted in the liquid to be drawn, the tube A being supported by the pins i i of the nut h as soon as they are made to penetrate the material from which the vessel containing the liquid is constructed, while the grooves h' of same nut admit the air within the vessel. The hand is then withdrawn from the rubber valve, which, while returning to its original form, produces the necessary vacuum, or suction, to raise the liquid through the tube A A and into the glass reservoir C, and even into the rubber bulb B, unless the stop-cock c be closed in time to prevent the liquid reaching it, the liquid being easily seen rising into the reservoir C, owing to the transparency of the glass or other transparent material from which the reservoir may be constructed.

As soon as the reservoir C is full of liquid, and the stop-cock c is closed, and it is desired to draw the liquid out, the stop-cock d" of the discharge-pipe d d' is turned open, when the liquid rushes out, and continues to do so as long as the main tube is fed and remains air-tight, or as long as the stop-cock d" remains open.

It must not be forgotten that in order to produce an effective apparatus, the rubber valve must be constructed, in size or thickness, in proportion to the diameter of the reservoir C, when the same is used, and to the length and width of the tube or siphon through which the liquid is to be drawn.

To use the other devices effectively, as when constructed and shown at figs. 2 and 3, it is only necessary that they should be connected to a siphon as in fig. 1, the operation being the same as in that device.

But when it is desired to sample and examine liquids through the samplers, figs. 4, 5 and 6, the stop-cock c of either is turned open first, (care should be taken to see that the stop-cock d' of fig. 4 be closed first when that device is to be used,) the rubber bulb B is then depressed by means of the hand which forces the air out of the reservoir C, when the latter is used, and out of the tube A through the perforations of the ball J. As soon as this is done, and while the rubber valve is still depressed by the hand, the perforated end, J, of the tube is inserted in the liquid to be drawn; the hand is then withdrawn from the rubber valve, which, while returning to its original position, creates the necessary suction to raise the liquid through the tube A, and within the reservoir C, in order that the same may be examined through the transparency of the glass or other transparent material from which the reservoir may be constructed. As soon as the reservoir C is full of liquid, the stop-cock c should be closed to prevent the liquid reaching and filling the rubber valve, and in order to discharge the liquid contained within the samplers with or without reservoirs, the stop-cock c is turned open, while the rubber valve is depressed at the same time to force the liquid out through the hollow perforated ball J, or other openings of the tube A.

An alternate equivalent arrangement of my devices for siphons, &c., as illustrated upon the drawings, can be placed upon legs in such a manner that a vessel to receive the liquid can be placed under the discharge-pipe d', (said pipe to be of any shape and length,) as it stands on a table, counter, floor, &c. I therefore reserve the exclusive right to apply and use legs to any of the herein-described devices whenever I shall deem it desirable. Still other modifications of the form of my apparatus might readily be made, without at all affecting its mode of operation, which is of such obvious character that no special description of the same need herein be given.

If necessary, the sections A and A of fig. 1 may be separated at a and a' by the withdrawal of the section m, and be placed further apart from each other, and again be reconnected air-tight by means of a rubber or other pipe, of any length to suit the purpose and distance needed.

Instead of using a glass, gutta-percha, or metal pipe or tube A, as shown, and connected to my apparatus at fig. 1, a rubber pipe of any length and width may be connected thereto, and be made to answer the same purpose.

Instead of forcing the liquid out of the samplers by the depression of the rubber valve, as before stated, a small air-tight faucet, or other equivalent contrivance, may be placed either upon the top of the reservoir C or near the stop-cock c, in such a manner that when open, the atmosphere shall so act upon the liquid contained within the reservoir and its tube that it shall be forced out through the perforations at J without further trouble.

If desirable, small air-tight faucets may also be applied to each of the devices, figs. 1, 2, and 3. In that case it would be preferable to place the faucets, or other equivalent contrivance, (orifice upward,) to the lower part of the discharge-pipe, or a little above the stop-cock d", to accelerate the flow or discharge of the liquid.

I wish it distinctly understood that I do not confine or limit myself to any particular size or shape of any of the herein-described devices; nor do I confine myself to any single material for the construction of any of the same. They may be made of glass, gutta-percha, India rubber, or of metal, or they may be made of a part of each of the above-named substances. The reservoir C, however, should be made entirely of glass or other transparent material, in preference to any of the other-named substances, and should be screwed, cemented, or otherwise secured air-tight in its position for use.

When made of metal, it may be necessary to vitrify, enamel, or electroplate such parts of the devices as may be exposed to the chemical action of acids. This I also reserve the right to do whenever necessary.

Having described my invention,

What I claim, and desire to secure by Letters Patent, is—

1. The combination of the induction-tube of a siphon with a discharge-pipe provided with a throat for receiving said induction-tube, a vacuum-creating rubber bulb, and stop-cocks c d", located, one on each side of the said throat, with or without the reservoir C between them, substantially in the manner and for the purposes shown and set forth.

2. The receiving-chamber or reservoir C arranged between the induction-end of the pipe and the rubber bulb, substantially in the manner herein shown, and for the purposes described.

3. Providing the liquid-receiving chamber or reservoir of the siphon or liquid-sampler with a discharge-tube and cock, as shown in fig. 4 of the accompanying drawings, by means of which the liquid in said chamber can be drawn off, substantially as and for the purposes specified.

4. The combination, with the screw-threaded end of the siphon, of a nut grooved and provided with pins by which the said siphon may be held to the vessel to which it is applied, substantially in the manner herein shown and set forth.

5. A liquid-sampler, consisting of a hollow rubber bulb in combination with a tapering tube provided with a stop-cock at or near the point where it is united with the said bulb, with or without a reservoir of glass or other suitable material interposed between the said stop-cock and the open end of the said tube, substantially as and for the purposes herein shown and specified.

In testimony whereof, I have signed my name to this specification before two subscribing witnesses.

ARTHUR BARBARIN.

Witnesses:
C. C. FLANDERS,
L. L. SMITH.